(12) United States Patent
Lucas

(10) Patent No.: US 9,371,893 B2
(45) Date of Patent: Jun. 21, 2016

(54) CONTOURED RADIUS CONTINUOUSLY VARIABLE TRANSMISSION

(71) Applicant: Jeffrey M. Lucas, Hopkins, MN (US)

(72) Inventor: Jeffrey M. Lucas, Hopkins, MN (US)

( * ) Notice: Subject to any disclaimer, the term of this patent is extended or adjusted under 35 U.S.C. 154(b) by 162 days.

(21) Appl. No.: 14/337,414

(22) Filed: Jul. 22, 2014

(65) Prior Publication Data

US 2015/0024883 A1 Jan. 22, 2015

Related U.S. Application Data

(60) Provisional application No. 61/856,806, filed on Jul. 22, 2013.

(51) Int. Cl.
*F16H 55/00* (2006.01)
*F16H 9/02* (2006.01)
*F16H 9/26* (2006.01)
*F16H 29/12* (2006.01)

(52) U.S. Cl.
CPC . *F16H 9/26* (2013.01); *F16H 29/12* (2013.01)

(58) Field of Classification Search
CPC ............. F16H 55/54; F16H 9/10; F16H 9/24; F16H 55/56; B62M 9/08
USPC ................................. 474/47, 49, 52
See application file for complete search history.

(56) References Cited

U.S. PATENT DOCUMENTS

| | | | | | |
|---|---|---|---|---|---|
| 1,016,158 | A * | 1/1912 | Karr | ......................... | F16H 55/54 474/49 |
| 2,000,834 | A * | 5/1935 | Frick | ......................... | F16H 55/00 474/47 |
| 2,266,538 | A * | 12/1941 | Evans | ..................... | D05B 35/06 112/152 |
| 2,269,573 | A * | 1/1942 | Barry | ...................... | E21B 47/04 188/218 R |
| 4,478,594 | A * | 10/1984 | Gayer | ........................ | F16H 7/08 474/13 |
| 4,539,000 | A * | 9/1985 | Gayer | ........................ | F16H 7/14 474/11 |
| 4,832,660 | A * | 5/1989 | Leonard | ................... | F16H 55/54 474/49 |
| 5,049,113 | A * | 9/1991 | Graham, Jr. | ............ | F16H 55/38 477/13 |
| 5,087,224 | A * | 2/1992 | Stranieri | ................. | F16H 29/14 474/50 |
| 5,492,506 | A * | 2/1996 | Lorance | .................. | F16H 55/54 474/49 |
| 5,688,199 | A * | 11/1997 | Spirig | ....................... | B62M 9/08 474/49 |
| 6,152,844 | A * | 11/2000 | Daugherty | .............. | F16H 55/54 474/49 |
| 6,267,699 | B1 * | 7/2001 | Gruich | ..................... | F16H 55/52 474/116 |
| 6,656,070 | B2 * | 12/2003 | Tay | ........................... | F16H 9/10 474/53 |
| 7,211,014 | B2 * | 5/2007 | Naude | ...................... | B62M 9/08 474/47 |
| 7,261,655 | B2 * | 8/2007 | Vargas | .................... | F16H 55/54 474/47 |
| 7,563,185 | B2 * | 7/2009 | Naude | ...................... | F16H 9/14 474/47 |
| 7,713,153 | B2 * | 5/2010 | Naude | ...................... | F16H 9/24 474/47 |
| 8,628,439 | B2 * | 1/2014 | Tay | ........................... | F16H 9/08 474/83 |
| 2002/0042314 | A1 * | 4/2002 | Mimura | .................. | F16H 55/54 474/56 |
| 2002/0151396 | A1 * | 10/2002 | Fragnito | ................. | F16H 15/18 474/83 |

(Continued)

*Primary Examiner* — Henry Liu

(57) ABSTRACT

A Contoured Radius Continuously Variable Transmission (CRCVT) varies the torque and speed of an output component relative to the torque and speed of the input component by forming the contour of a belt-like component so that the belt-like component's radial distance from the input and/or output axis is gradually altered from being uniform throughout its length to being varied for different periods along its length.

8 Claims, 4 Drawing Sheets

(56) References Cited

U.S. PATENT DOCUMENTS

| | | | | |
|---|---|---|---|---|
| 2004/0038763 A1* | 2/2004 | Serkh | ............ | F16H 55/54 474/54 |
| 2005/0148416 A1* | 7/2005 | Naude | ............ | B62M 9/08 474/49 |
| 2005/0227797 A1* | 10/2005 | Jeng | ............ | F16H 55/54 474/47 |
| 2005/0288137 A1* | 12/2005 | Vargas | ............ | F16H 55/54 474/47 |
| 2006/0252589 A1* | 11/2006 | Tay | ............ | F16H 9/08 474/83 |
| 2007/0054766 A1* | 3/2007 | Shamis | ............ | F16H 55/54 474/47 |
| 2007/0087875 A1* | 4/2007 | Weaver | ............ | F16H 55/54 474/51 |
| 2008/0058138 A1* | 3/2008 | Tay | ............ | F16H 9/08 474/83 |
| 2011/0230286 A1* | 9/2011 | Cohen | ............ | B62M 9/08 474/49 |
| 2014/0162816 A1* | 6/2014 | Clopet | ............ | F16H 9/10 474/49 |

* cited by examiner

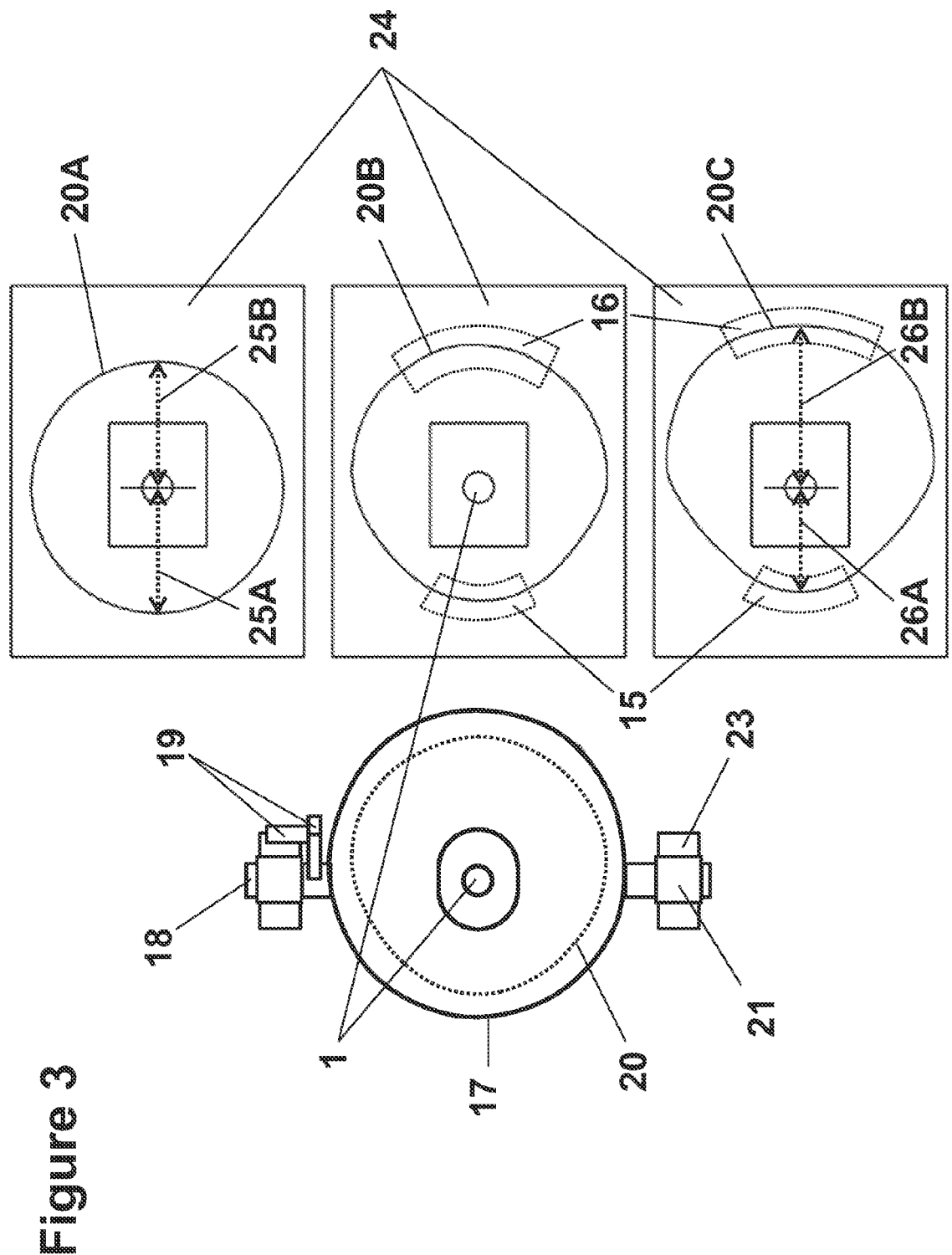

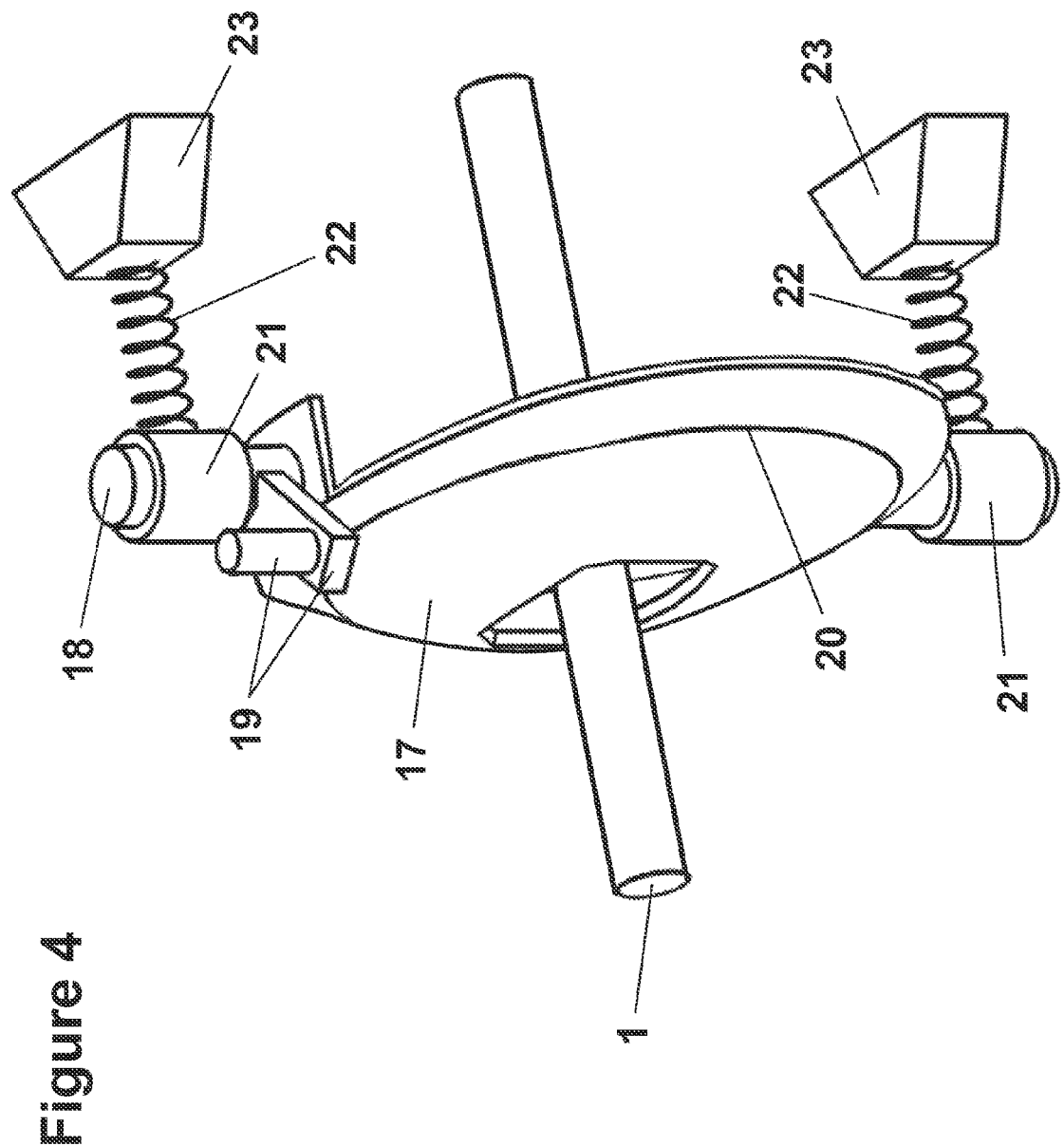

though linear bearings 5, which pivot within the ring

CONTOURED RADIUS CONTINUOUSLY VARIABLE TRANSMISSION

CROSS REFERENCE TO RELATED APPLICATION

This application claims benefit of U.S. Provisional Application Ser. No. 61/856,806, filed Jul. 22, 2013, which application is incorporated herein by reference in its entirety.

SUMMARY

The present disclosure relates to a continuously variable transmission (CVT) wherein the conversion of mechanical work between high force/low distance and low force/high distance is accomplished by varying the radius of a ring-like component relative to the input and/or output axis. This variation in radius produces a change in both the force and distance of an output component relative to an input component. Although the length variance ratio is limited, the system can be configured to produce a final output with increased gear ratio, for example from zero rotation (infinite torque) to maximum rotation (reduced torque). Having solidly interlocked power transmitting components, there is no possible means for loss of engagement (slippage) between components, short of component breakage.

The Contoured Radius Continuously Variable Transmission (CRCVT) provides significant advantages over other forms of continuously variable transmissions currently available in the following ways:

1. It does not depend on a smooth-surface, friction-based contact of torque transmitting parts to obtain variability; therefore, higher torques can be applied to the system without introducing significant wear to parts that drive each other by means of smooth surface contact or to parts that support significant side loads due to the excessive contact pressures needed to prevent slippage between components that are transmitting high torques.

2. It eliminates the energy losses associated with friction-based systems that rely on increasing friction between driving components to prevent slippage between them, as is common to belt and pulley type designs. Many belt designs accommodate higher torques by increasing the contacting surface area between driving and driven parts, as opposed to increasing the pressure between smooth-surface parts. This added surface area contact produces added friction, lowering overall efficiency.

3. It does not depend on the movement of fluid to obtain variability, as is the case with continuously variable hydrostatic transmissions; therefore, similar torque loads can be handled with much greater energy efficiency than hydrostatic transmissions. As is known in the art, significant friction is produced as fluid is moved through the pump and motor of a hydrostatic transmission. This friction results in significant energy losses. Friction losses of this nature are not present in the CRCVT.

4. It does not depend on the conversion of mechanical energy into electrical energy and back; therefore, electrical motors and/or generators and their accompanying electrical energy converters are not part of the system. This eliminates the drawbacks of electrical continuously variable transmissions such as high heat production, over sizing electrical components, or operating in environments poorly suited to electricity.

5. It provides a continuously smooth velocity output, which is not present in most one-way-clutch type designs.

6. It increases efficiency and machine life by eliminating components that change direction or fluctuate in speed, as in most one-way-clutch type designs.

7. It provides torque variance (in addition to speed variance), which is not present in some one-way-clutch type designs.

The CRCVT provides an efficient and effective means for continuously varying mechanical speed and torque.

BRIEF DESCRIPTION OF THE DRAWINGS

FIGS. 1 through 4 illustrate the design and operation of an example embodiment. The example embodiment uses a flexible ring, the exact contour of which is formed by adjustable sheaves. Since the adjustable sheaves do not rotate along with the ring, the ring should also have some means of reducing friction between the ring side surfaces and the sheave surfaces—rollers, bearing balls, bushings, etc. As the sheaves pivot slightly, the contour of the ring is varied from a circular shape that is coaxial with the input and output shafts to an "egg shape" that is eccentric to the input/output axes. The shape of the sheaves should be such that the contact circumference stays the same no matter what the contour of the ring. Slight variances can be accommodated by spring loading the sheaves against the sides of the ring. The shape of the sheaves should also be such that there is always a period of uniform radius for the smallest contour radius and a period of uniform radius for the largest contour radius. These periods of uniform radius provide a steady speed period wherein transmission of torque can be transferred from one one-way clutch to another. The steady speed periods also produce a uniform output when a uniform input is applied.

Having one-way clutches on the input shaft, the input shaft drives the radial arms during the large radius period when the rotational speed is slowest. During the small radius period, the radial arms override the input shaft because they are rotating faster. In a complimentary fashion, the output shaft is also driven by one-way clutches. However, since these clutches are being driven, it is the fastest rotations during the small radius period that drive the output. The slower rotations during the larger radius periods simply "under-ride" or slip backward relative to the output shaft speed. In short, the asymmetry of the ring yields a faster output than input. As the ring is reshaped to a perfect circle with equal radial distance from the axis of rotation, the output speed gradually comes to equal the input speed. This is how the continuous variability of the CRCVT is produced.

If a zero maximum speed output is desired, the input can be reversed and summed with the output through differential gearing so that when input/output clutch speeds are equal, the combined output is zero; and, as the clutch output speed becomes greater than the clutch input speed, the combined output gradually increases. This then creates an infinitely variable version of the CRCVT.

DETAILED DESCRIPTION

Figure 1:
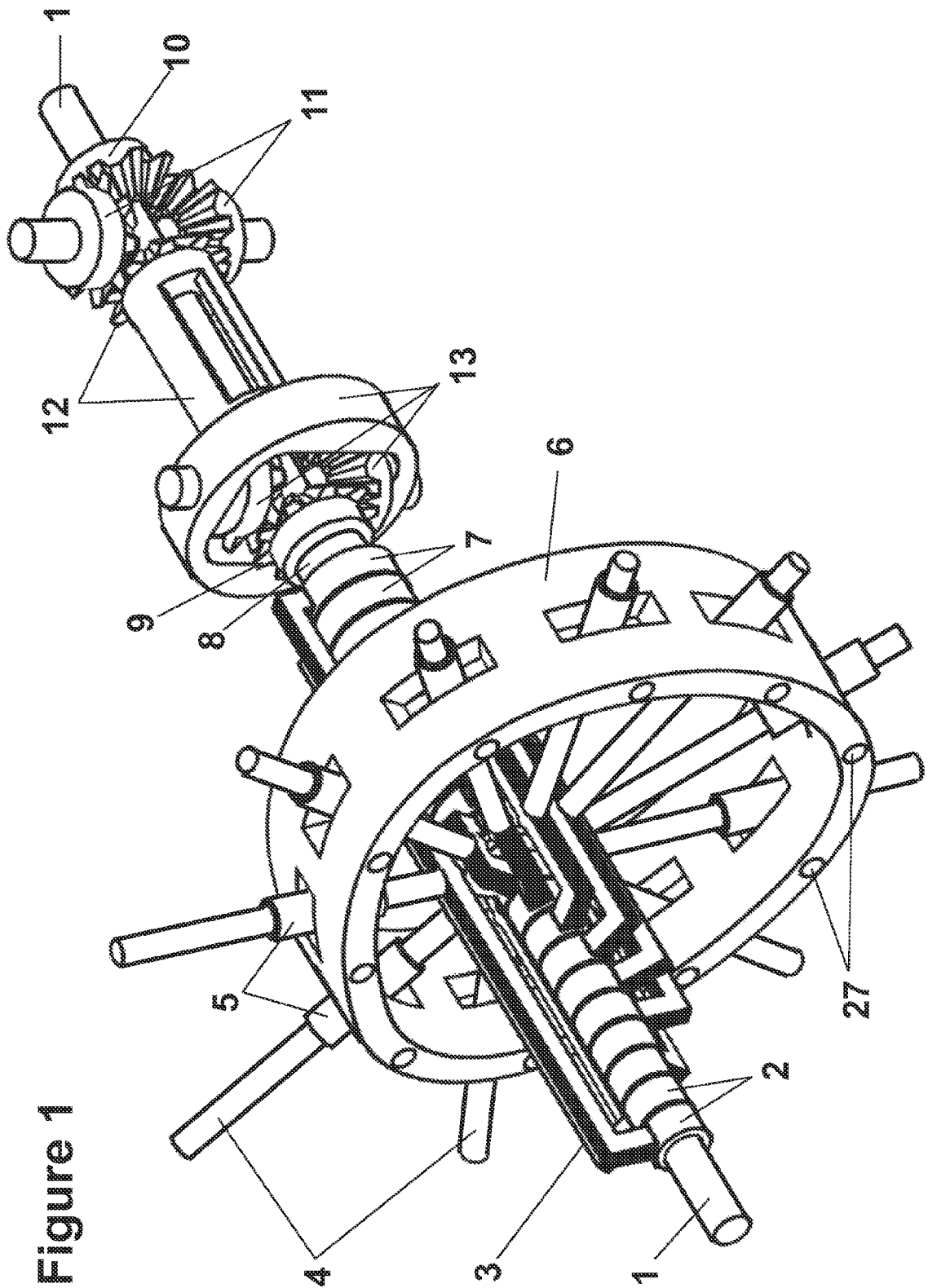
Figure 2:
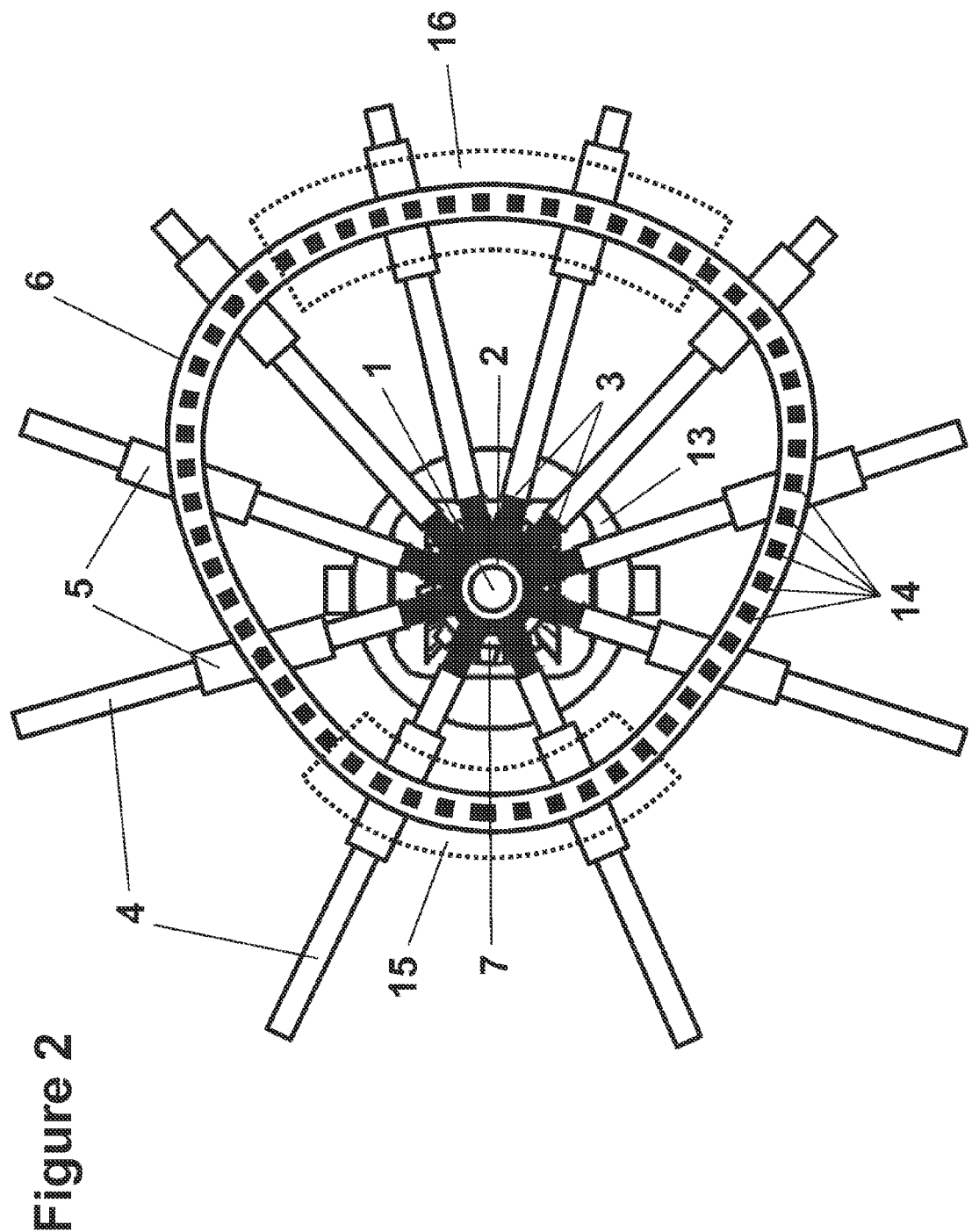

FIG. 1 shows an angled perspective view and FIG. 2 shows a straight axial view of the example embodiment's drive system. Input shaft 1 drives one-way input clutches 2 which in turn drive radial arms 4, which are fastened to one-way input clutches 2 through connecting links 3. Radial arms 4 drive contoured radius ring 6 by being linked to contoured radius ring 6 through linear bearings 5, which pivot within the ring on pivot rods 27. Transmission of torque from input shaft 1 to contoured ring 6 takes place only within a slowest rotation period 16, when the radial distance from input shaft 1 to contoured radius ring 6 is the greatest. Contoured ring 6 changes from being driven to being the driver during a fastest rotation period 15. Through the fastest rotation period 15, contoured ring 6 drives one-way output clutches 7 by transmitting output torque through the same linear bearings 5, radial arms 4, and connecting links 3, as they pass through the fastest rotation period 15. Each radial arm 4 is connected to its own distinct connecting link 3, which is connected to a distinct set of one-way clutches 2 (input) and 7 (output). As such, each radial arm 4 alternates between being driven by input shaft 1 through slowest rotation period 16 and being the driver of clutched output shaft 8 through fastest rotation period 15.

In applications where a zero output is unnecessary, the output of the CRCVT can end with clutched output shaft 8. However, in applications where a final output of zero is desirable, the output of clutched output shaft 8 can be combined with the input of input shaft 1 to produce a minimum final output of zero. In this case, input shaft 1 would drive input gear 10; input gear 10 would drive reversing gears 11, and reversing gears 11 would drive reversed input 12. Reversing gears 11 rotate on an axis that has a fixed position and orientation. Since reversed input 12 turns in a direction opposite that of clutched output shaft 8, the rotation of a combined output differential 13 would be zero when reversed input 12 and clutched output shaft 8 rotate at the same speed. As the speed of clutched output shaft 8 is gradually increased relative to input shaft 1 and reversed input 12, the final output of combined output differential 13 gradually increases. In this manner the output of the CRCVT can be continuously varied from zero to its maximum speed.

FIG. 3 shows a straight axial view and FIG. 4 shows an angled perspective view of the example embodiment's ring contouring system. In application, the system would likely have two contouring sheaves 17, one on each side of contoured radius ring 6, as opposed to just one as shown. Since the adjustable sheaves do not rotate along with the ring, the ring should also have some means of reducing friction between the ring side surfaces and the sheave surfaces—rollers, bearing balls, bushings, etc. Ring rollers 14 are depicted in FIG. 2.

Contouring sheave 17 is shaped such that as it pivots slightly on pivot shaft 18, the contour of its contact with the side surfaces of contoured radius ring 6 varies. The contact between contouring sheave 17 and the sides of contoured radius ring 6 is depicted as contact lines 20, 20A, 20B, and 20C. Contact planes 24 are depicted on the right side of FIG. 3. As the 3-dimensional contouring sheave 17 intersects with the 2-dimensional intersection planes 24, an intersecting contact line 20A, 20B, and 20C is derived. This intersecting contact line represents the contour of contoured radius ring 6 as contouring sheave 17 is pressed up against the sides of contoured radius ring 6.

In its zero output position, the angle of contouring sheave 17 is such that contact line 20A is perfectly circular, and its radial distance from the axis of input shaft 1 is uniform. In other words, contact line 20A is a perfect circle with its center aligned to the center of input shaft 1. Radius 25A and radius 25B are equal. When contouring sheave 17 is angled so that its resulting line of contact parallels 20A the rotational speed of each radial arm 4 stays consistent for all 360 degrees of rotation. In this position the clutched input is equal to the clutched output. When contouring sheave 17 is angled so that its resulting line of contact parallels line 20C the rotational speed of each radial arm 4 varies. When a radial arm 4 intersects with contoured radius ring 6 with a lengthened radius 26B the rotational speed of that radial arm 4 at that point in its rotation will be slower than when that same radial arm 4 intersects with contoured radius ring 6 with a shortened radius 26A.

Contact line 20B represents the line of contact (between contouring sheave 17 and the sides of contoured radius ring 6) when contouring sheave is angled near the midway point between its zero discrepancy position contact line 20A and its maximum discrepancy position contact line 20C. At this midway point, contact line 20B is not as far off center as contact line 20C and its discrepancy between the longest and shortest radial lengths is not as pronounced as contact line 20C.

The progression between contact line 20A and contact line 20C is gradual, as opposed to stepwise. Additionally, all contact lines throughout the gradual progression from 20A to 20B to 20C have a period of uniform radius for the shortest radius 15 and a period of uniform radius for the longest radius 16.

Pivot shaft 18 has rotational freedom within bushings 21. Pivot arm 19 is representative of some means for pivoting contouring sheave 17 on pivot shaft 18's axis. Springs 22 are representative of some means for pushing contouring sheaves 17 against the sides of contoured radius ring 6, so as to take up any unwanted slack in contoured radius ring 6. Anchor points 23 represent fixed points, perhaps on the housing of the transmission, to which springs 22 can be anchored. Springs 22 push bushings 21. Bushings 21 push contouring sheave 17 by way of pivot shaft 18, which is attached to contouring sheave 17.

The invention claimed is:

1. A mechanism comprising:
   a rotating ring-like component, drive arm components, and one-way clutches, wherein articulation of the drive arm components and one-way clutches is varied by gradually translating a rotational axis of the rotating ring-like component, wherein a contact between the rotating ring-like component and the drive arm components is a solid engagement, and wherein the solid engagement forces the drive arm components to articulate independent of friction.

2. The mechanism of claim 1, wherein the non-uniform output of the one-way clutches is reduced in variation of amplitude by changing the contour of the rotating ring-like component.

3. The mechanism of claim 1, wherein the varied articulation of drive arm components and one-way clutches is used to vary a torque and speed of an output component relative to a torque and speed of an input component.

4. The mechanism of claim 2, wherein the varied articulation of drive arm components and one-way clutches is used to vary a torque and speed of an output component relative to a torque and speed of an input component.

5. A mechanism comprising:
   rotating ring-like components, drive arm components, and one-way clutches, wherein articulation of the drive arm components and one-way clutches is varied by gradually translating a rotational axis of the rotating ring-like components, wherein a contact between the rotating ring-like components and the drive arm components is a solid engagement, and wherein the solid engagement forces the drive arm components to articulate independent of friction.

6. The mechanism of claim 5, wherein the non-uniform output of the one-way clutches is reduced in variation of amplitude by changing the contour of the rotating ring-like components.

7. The mechanism of claim 5, wherein the varied articulation of drive arm components and one-way clutches is used to vary a torque and speed of an output component relative to a torque and speed of an input component.

8. The mechanism of claim 6, wherein the varied articulation of drive arm components and one-way clutches is used to vary a torque and speed of an output component relative to a torque and speed of an input component.

\* \* \* \* \*